United States Patent
Vasileuskaya-Schulz et al.

(10) Patent No.: US 12,516,368 B2
(45) Date of Patent: Jan. 6, 2026

(54) METHOD FOR THE DETECTION OF LIVING MICROORGANISMS AND A FLUIDIC CHANNEL SYSTEM

(71) Applicant: Testo bioAnalytics GmbH, Titisee-Neustadt (DE)

(72) Inventors: Zinaida Vasileuskaya-Schulz, Freiburg (DE); Paul Quehl, Gottingen (DE); Stefanie Boos, Villingen-Schwenningen (DE); Joel Riemer, Breitnau (DE); Serge Ruden, Titisee-Neustadt (DE); Daniel Braga, Freiburg (DE)

(73) Assignee: Testo bioAnalytics GmbH, Titisee-Neustadt (DE)

( * ) Notice: Subject to any disclaimer, the term of this patent is extended or adjusted under 35 U.S.C. 154(b) by 331 days.

(21) Appl. No.: 17/174,398

(22) Filed: Feb. 12, 2021

(65) Prior Publication Data
US 2021/0254144 A1    Aug. 19, 2021

(30) Foreign Application Priority Data

Feb. 14, 2020    (DE) .......................... 102020103971.9

(51) Int. Cl.
*C12Q 1/68*    (2018.01)
*B01L 3/00*    (2006.01)
*C12Q 1/6841*    (2018.01)

(52) U.S. Cl.
CPC ...... *C12Q 1/6841* (2013.01); *B01L 3/502761* (2013.01); *B01L 2200/0652* (2013.01)

(58) Field of Classification Search
USPC ......... 435/6.1, 6.11, 91.1, 183; 436/94, 501; 536/23.1, 24.3
See application file for complete search history.

(56) References Cited

U.S. PATENT DOCUMENTS

| | | |
|---|---|---|
| 2003/0203374 A1 | 10/2003 | Rudi |
| 2014/0186828 A1 | 7/2014 | Shawn |
| 2022/0098645 A1 | 3/2022 | Agel et al. |

FOREIGN PATENT DOCUMENTS

| | | |
|---|---|---|
| CN | 1982476 A | 6/2007 |
| CN | 101341249 A | 1/2009 |
| CN | 102016066 A | 4/2011 |
| CN | 102146480 A | 8/2011 |
| CN | 102414326 A | 4/2012 |
| CN | 103476945 A | 12/2013 |

(Continued)

OTHER PUBLICATIONS

"What is the Difference Between Living and Dead Cells". Printed on Jun. 16, 2023. "Is helicase used in RNA?" and "small interfering RNA" from Wikipedia. Printed on Jun. 26, 2023.*

(Continued)

*Primary Examiner* — Frank W Lu
(74) *Attorney, Agent, or Firm* — Volpe Koenig

(57) ABSTRACT

A method (7) for detecting living microorganisms (1) and/or for differentiating between living (12) and dead (13) microorganisms in a sample (9) by in-situ hybridization (14), especially fluorescence in-situ hybridization, and optical analysis (26) of the microorganisms (1) to be detected, wherein at least one substance (10) is added to the sample (9) before the hybridization (14), which substance (10) promotes a differing alteration of the RNA concentration in dead cells and in living cells.

17 Claims, 2 Drawing Sheets

(56) References Cited

FOREIGN PATENT DOCUMENTS

| CN | 103509850 A | 1/2014 |
|---|---|---|
| CN | 104561354 | 10/2015 |
| CN | 107430105 A | 12/2017 |
| CN | 109307664 A | 2/2019 |
| CN | 113265446 A | 8/2021 |
| TR | 201820388 | 1/2019 |
| WO | 1997018325 A1 | 5/1997 |
| WO | 2012143661 A1 | 10/2012 |
| WO | 2020136595 | 7/2020 |

OTHER PUBLICATIONS

Burger, Cleavage of Nucleic Acids by Bleomycin. Chem. Rev., 98, 1153-169, 1998.*
Fleming et al., Rates of Chemical Cleavage of DNA and RNA Oligomers Containing Guanine Oxidation Products. Chemical Research in Toxicology, 28, 1292-1300, 2015.*
Hayes et al., Roles of Molecular Chaperones in Protein Degradation. The Journal of Cell Biology, 132, 255-258, 1996.*
Pei, How Do Biomolecules Cross the Cell Membrane? Acc. Chem. Res., 55, 309-318, 2022.*
"Flow cytometry" from Wikipedia. Printed on Mar. 5, 2025.*
Park Seongjin et al: "An Improved Method for Bacterial Immunofluorescence Staining to Eliminate Antibody Exclusion from the Fixed Nucleoid", Biochemistry, vol. 58, Nr. 45, pp. 4457-4465, Nov. 12, 2019 (Nov. 12, 2019).
Rodriguez-Mateos Pablo et al: "FISH and chips: a review of microfluidic platforms for FISH analysis", Medical Microbiology and Immunology, Springer, Germany, vol. 209, Nr. 3, pp. 373-391, Jan. 21, 2020 (Jan. 21, 2020).
Rohde Alexander et al: "Differential detection of pathogenic Yersinia spp. by fluorescencein situ hybridization", Food Microbiology, Academic Press Ltd, London, GB, vol. 62, pp. 39-45, Sep. 21, 2016 (Sep. 21, 2016).
Batani, G. [u.a.]: Fluorescence in situ hybridization (FISH) and cell sorting of living bacteria. Sci. Rep. (Dec. 9, 2019) (1) 18618, Druckseiten 1-13.
Common Knowledge Evidence, Ding Wei and Wang Deitan (ed.), "Concise Pathologic Techniques", Zhejiang Science and technology Press, pp. 174 and 175, Feb. 2014.
PMA, Abstracts of Food Summit in China 2013 and 10th Annual Meeting of CIFST, p. 174, .cnki.net.

* cited by examiner

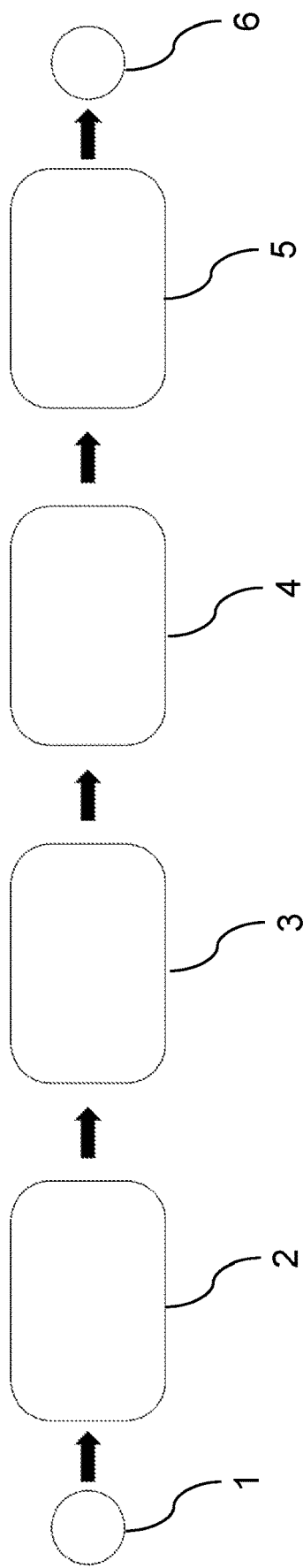
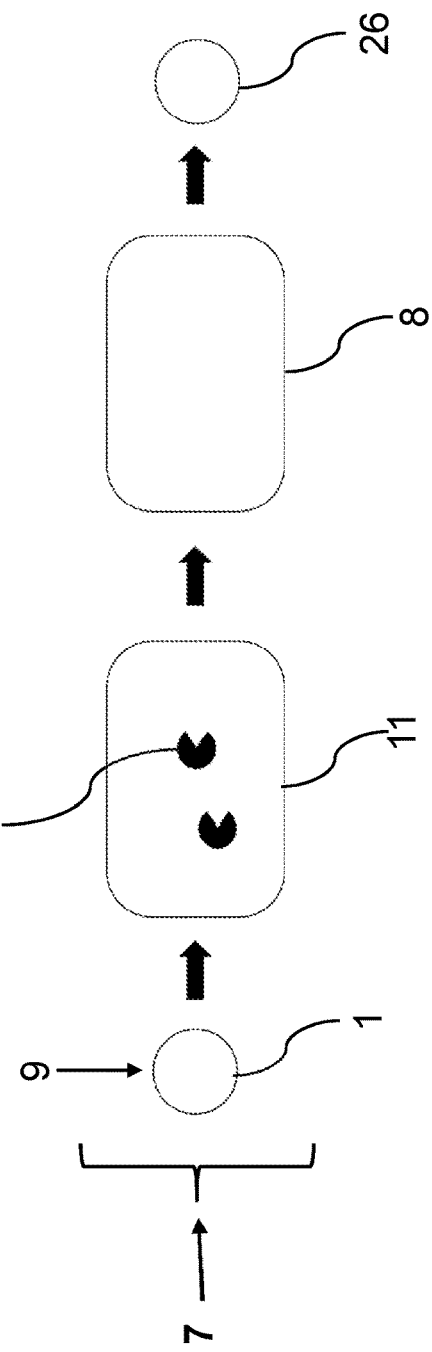

METHOD FOR THE DETECTION OF LIVING MICROORGANISMS AND A FLUIDIC CHANNEL SYSTEM

INCORPORATION BY REFERENCE

German Patent Application No. 10 2020 103 971.9, filed Feb. 14, 2020, is incorporated herein by reference as if fully set forth.

TECHNICAL FIELD

The invention relates to a method for detecting living microorganisms and/or for differentiating between living and dead microorganisms in a sample by in-situ hybridization, especially fluorescence in-situ hybridization, and optical analysis of the microorganisms to be detected, wherein at least one substance is added to the sample before the hybridization, which substance promotes a differing alteration of the nucleic acid concentration, especially RNA concentration and/or DNA concentration, in dead cells and in living cells.

Known methods for the detection of nucleic acids in individual cells include, for example, in-situ hybridization (ISH) and fluorescence in-situ hybridization (FISH). This involves using short synthetic nucleic acid probes which bind to the target sequence to be detected via base pairings. In-situ hybridization and fluorescence in-situ hybridization, in which the nucleic acid probes are fluorescently labeled, can be used for the specific detection of nucleic acids (DNA and/or RNA molecules).

The specific detection of nucleic acids is, for example, used in production control and/or quality control. It is important that microbiological safety can be ensured for a multitude of substances, raw materials and products from the different areas of industry, health or gastronomy. For example, it is possible by this means to check whether cleaning/disinfection was successful in the case of a method for cleaning a surface.

Molecular biology methods, for example PCR, allow the nucleic acid of a microorganism to be detected within a few hours. What is determined, however, is the total DNA/RNA of all living and dead microorganism pathogens. However, only the microorganisms which can cause an infection are of relevance to hygienic assessments, and not microorganisms which are already dead and which can no longer cause a disease. It is therefore important for a detection method that differentiation between living and dead microorganisms takes place.

SUMMARY

Against this background, it is an object of the present invention to provide a simple and rapid method for detecting microorganisms in a sample, which method makes it possible to differentiate living microorganisms from dead microorganisms and is also performable outside laboratory environments.

The invention achieves this object through one or more of the features described herein. In particular, what is therefore proposed according to the invention to achieve the stated object in a method of the kind described at the start is that at least one substance is added to the sample to be tested before the hybridization, which substance promotes a differing alteration of the nucleic acid concentration, especially RNA concentration and/or DNA concentration, in dead cells and in living cells.

In relation to this, the invention takes advantage of the fact that differentiation between living and dead microorganisms can be made possible by addition of at least one substance to the sample before the hybridization, which substance promotes a differing alteration of the nucleic acid concentration in dead cells and in living cells. For example, the RNA concentration and/or DNA concentration can be reduced in dead cells and/or increased in living cells. As an alternative or in addition, the RNA concentration and/or DNA concentration can be reduced at different rates in dead and living cells. As an alternative or in addition, the accessibility for detection reagents to RNA and/or DNA in dead or living cells can be modified. As an alternative or in addition, further detection reagents can be introduced into the cells as living or "dead" indicators and be likewise read as information.

In an advantageous embodiment according to the invention, the substance added contains at least one chemical substance which degrades RNA and/or DNA. The chemical substance which degrades RNA and/or DNA can be an enzyme. For example, this is a DNAse. The substance added can also be an RNAse. The advantage here is that an RNAse can penetrate into the dead cells, which are much more permeable than the living cells, i.e., are often distinguished by increased permeability, and become enzymatically active in the cellular space. As a result, dead particles can be removed, and this can considerably improve living/dead differentiation. The substance added can also contain a chemical substance which promotes RNA degradation and/or DNA degradation. (EDTA), can be used as a protective substance against metalloenzymes. In an advantageous embodiment, the concentration of EDTA is 0.1-2 M, preferably 0.1-1 M, particularly preferably 0.5 M. It is also possible to use further substances such as, for example, diethylenetriaminepentaacetic acid (DTPA), triethylenetetraminehexaacetic acid (TTHA), RNA helicase, polymerase, chaperone or siRNA. As an alternative or in addition, the substance added can, however, also contain a chemical substance which increases permeability in dead cells. In particular, it is murein hydrolase, lysozyme, mutanolysin, glucosaminidase, peptidase or amidase. The peptidases used, i.e., enzymes which cleave proteins or peptides, can be exopeptidases and/or endopeptidases, depending on the location within the polypeptide chain to be cleaved. As an alternative or in addition, the substance added can also contain a selective or nonselective growth medium which promotes RNA synthesis and/or DNA synthesis in living cells. For example, this is a peptone water, CASO broth, DEV lactose broth, MRS medium, thioglycolate broth, brain heart infusion broth, casein-peptone soymeal-peptone broth, Hajna's GN (Gram-negative) enrichment broth and/or LB medium.

Furthermore, in an advantageous embodiment according to the invention, the microorganisms are at least incubated with addition of the substances. In particular, the microorganisms are incubated before the hybridization. The incubation time can be set such that cell division does not yet take place. As a result, the probability of dead cells being captured as a false-positive signal can be lowered by several orders of magnitude, since these dead particles are greatly reduced by the incubation of the microorganisms before the hybridization.

In an advantageous embodiment according to the invention, the hybridization comprises at least two of the steps of fixation, permeabilization and denaturation. In particular, the fixation can be effected by a denaturation substance. This allows an advantageous composition of the hybridization buffer, in which the same agent can be used for fixation and denaturation.

The hybridization can also comprise all of the steps of fixation, permeabilization and denaturation. Preferably, the hybridization takes place in a hybridization buffer. The hybridization buffer contains, for example, a nontoxic substance, especially guanidinium chloride and/or urea, as denaturation substance. As an alternative or in addition, the denaturation substances can also be guanidinium thiocyanate and/or formamide. However, the use of urea is preferred.

This ensures that the use of guanidinium chloride and/or urea instead of water-polluting substances or instead of the toxic formamide allows the application of the method according to the invention without a laboratory. The advantage here is that the reagents can be stored in dry form and subsequently disposed of as domestic waste. In an advantageous embodiment, the concentration of the guanidinium chloride is 0.1-2 M, preferably 0.1-1 M, particularly preferably 0.5 M. The advantage here is that guanidinium chloride in a concentration of over 0.25 M can provide increasing protection against RNAses with increase in concentration. As an alternative, a mixture of guanidinium chloride and urea can be used in a preferred concentration of 5.3 M urea with 0.5 M guanidinium chloride. This allows improved protection against RNAses. ListeriaFISH does not require a denaturation agent.

In an advantageous embodiment according to the invention, a detergent is added to the sample before the hybridization, especially a fixation step, is completed. The advantage here is that effective penetration of detection probes into the cell can be made possible by addition of a detergent to the sample. The detergent is, for example, sodium dodecyl sulfate (SDS). ListeriaFISH does not require a denaturation agent.

In an advantageous embodiment, the concentration of the SDS is 0.003%-0.05%. For ListeriaFISH, the concentration of SDS is 0.075%. What can be achievable by the addition of the detergent before the fixation step is completed is that nonlysed, individual microorganisms can be subsequently detected. In particular, the detergent is not added before the start of fixation. The addition of the detergent before the start of fixation, in which further alteration of the structure of the microorganisms is prevented, would hamper the detection of the reaction products generated in the individual microorganisms by the hybridization.

As an alternative or in addition, living/dead differentiation of the microorganisms contained in the sample can be carried out before the hybridization. The detection of exclusively living microorganisms can therefore be made possible.

In an advantageous embodiment according to the invention, the hybridization buffer contains at least one denaturant and an RNAse-inhibiting substance. This can stabilize the nucleic acid hybrids and also ensure protection against RNAses. For living/dead differentiation in ListeriaFISH, neither denaturants nor RNAse inhibitors are used.

In an advantageous embodiment according to the invention, the RNAse-inhibiting substance is selected from guanidinium chloride, guanidinium thiocyanate, formamide, dithiothreitol (DTT), diethyl pyrocarbonate (DEPC), oligovinylsulfonic acid, polyvinylsulfonic acid, heparin, and glutathione. For living/dead differentiation in ListeriaFISH, neither denaturants nor RNAse inhibitors are used.

In an advantageous embodiment according to the invention, the hybridization buffer contains at least one salt, preferably sodium chloride. The use of salts in the hybridization buffer can increase the renaturation rate of the double-stranded nucleic acid hybrids and thus also the hybridization efficiency. In addition, other salts such as, for example, magnesium chloride and/or potassium chloride can also be present. The addition of magnesium chloride can make it possible to promote hybrid formation. In an advantageous embodiment, the concentration of sodium chloride is 25-1100 mM, preferably 750-1000 mM, particularly preferably 800-900 mM. For ListeriaFISH, sodium chloride is used in a concentration of 1250 mM. The preferred concentration of magnesium chloride is 0.01-50 mM.

The hybridization buffer can contain tris(hydroxymethyl) aminomethane hydrochloride (TRIS-HCl) as buffer substance. The advantage here is that the buffer substance stabilizes the pH of the buffer between 5.5 and 8.7. In an advantageous embodiment, the concentration of the buffer substance is 10-100 mM.

In addition, RNA oligonucleotides can be contained in the hybridization buffer as "sacrifice substrate". What is achievable as a result is improved initial protection against RNAse activity. In an advantageous embodiment, the concentration of RNA oligonucleotides is 0.1-100 µM.

In an advantageous embodiment according to the invention, the optical analysis comprises a step of detection, preferably of quantification, of the microorganisms with hybridized nucleic acid probes. As an alternative or in addition, the optical analysis can be effected by single-detection of the microorganisms. Absolute quantification of the organisms to be detected on the basis of particle measurement can therefore be made possible.

In an advantageous embodiment according to the invention, the nucleic acid probe is complementary to an RNA of a microorganism to be detected. Preferably, the nucleic acid probe can be selected from linear oligonucleotide probes. Examples include mono-labeled probes, dual-labeled probes, tetra-labeled probes and multi-labeled probes. The nucleic acid probe can also be selected from nucleic acid probes having secondary structure. Examples include molecular beacons and Scorpions probes. What is achievable as a result is a higher fluorescence intensity and also a better signal-to-noise ratio, which is advantageous especially for an automated application.

In an advantageous embodiment according to the invention, the nucleic acid probe is connected to a detectable label. The detectable label can, for example, be a fluorescent label, a chemiluminescent label, an affinity label or an enzymatically active group. Optical detection is therefore achievable. The affinity label can, for example, include biotin-streptavidin or antigen-antibody affinity binding pairs. The enzymatic label can, for example, be peroxidase, preferably horseradish peroxidase, or phosphatase, preferably alkaline phosphatase.

It is particularly advantageous when any background fluorescence or nonspecific fluorescence arising in the FISH methods described here is reduced or eliminated. As a result, automated detection methods in particular can operate more specifically or with a better detection limit. Nonspecific fluorescence can be brought about by various circumstances. These include:

The incomplete quenching efficiency of the quencher molecules used. Especially at high concentrations of FISH probes used, this gives rise to a high nonspecific background fluorescence due to FISH probes which are in excess (not bound to the target RNA/DNA).

The FISH probes can bind nonspecifically to non-target sequences or are incompletely closed and therefore not quenched or incompletely quenched.

As countermeasures for the abovementioned background fluorescence and for significant improvement of the signal-to-noise ratio, the following methods can therefore be applied (one method or a combination of these methods):

Fluorescence cascade: In accordance with/in analogy to Förster resonance energy transfer, a second dye is integrated into the method. The sample is irradiated with a light source of a wavelength through which the dye/reporter of the FISH probes does not fluoresce and therefore does not generate background fluorescence. Instead, a second dye (here: "fluorescence donor" with donor fluorophore) is introduced into the assay, which fluoresces owing to the introduced excitation wavelength and the emitted light (due to the fluorescence shift into a longer-wavelength range) is in turn capable of exciting the dye of the, for example, FISH probes/molecular beacons (here: "fluorescence acceptor" with acceptor fluorophore) to cause fluorescence. The emission spectrum in which the donor fluorophore fluoresces is beyond or only slightly within the detection spectrum/detection wavelengths of the detector and therefore does not generate relevant background fluorescence. The mechanism of this two-stage fluorescence only works or only works sufficiently when donor fluorophore and acceptor fluorophore are in sufficient spatial proximity and are not quenched by a quencher molecule. FISH probes used in this method can assume the fluorescence acceptor or the fluorescence donor function or else both functions. Ideally suitable here are combinations of oligos (DNA/RNA molecules) respectively provided with the donor fluorophore and acceptor fluorophore, which oligos are brought together in close proximity. In addition, binding sites within the target organism are chosen, which binding sites are adjacent or are close to one another owing to secondary structures and to which binding sites the oligos (fluorescence donor and fluorescence acceptor) bind. The acceptor fluorophore or donor fluorophore can, however, also be a, for example, profluorescent dye and be converted by enzymes within the target cells to form a fluorophore usable for detection (e.g., carboxyfluorescein) or be taken up in certain cell structures (such as RNA, DNA, proteins and lipids) (dyes such as, for example, SYBR Green, ethidium bromide, Coomassie) or accumulate within the target organism (e.g., tetramethylrhodamine methyl ester) and thus likewise be brought in sufficient spatial proximity of the donor fluorophore or acceptor fluorophore. What may be particularly advantageous are methods which bring either the donor fluorophore or the acceptor fluorophore having a nonspecific target (the target can, for example, be RNA or DNA) in sufficient proximity of whichever is the other fluorophore, since costs for the specific synthesis of, for example, specific FISH probes can thus be avoided. At the same time, the method can be thus used in a standardized manner for the improvement of other FISH assays and independently of the specific target sequences thereof. Especially the use of fluorophore-labeled "random" oligos, such as, for example, "random hexamers", or other random oligo sequences is advantageous, since a mixture of all possible (for example) oligo-hexamer sequence options (this is the meaning of "random hexamers") can bind to all single-stranded sequence options of nucleic acids. These "random" oligos can be labeled with one or more dyes at the 3' end and/or at the 5' end. By using a combination of fluorescence donors and acceptors, it is also possible to generally dispense with the use of quenchers in the FISH method described here and to thus create more cost-effective FISH probes (without quencher molecules) and with identical specificity, since specificity can be achieved by the required spatial proximity of the bound dyes (e.g., two specific oligos with dyes). For the use of nonspecific fluorescence donors or acceptors, it should be ensured that they are introduced only after the annealing step ("binding step") with the specific reagent (specific FISH probe), since they may otherwise occupy the binding positions of the specific FISH probes and lead to false-negative results. If use is made of profluorescent dyes which must first be converted by enzymes of the stained cells for example or only accumulate in cells with a sufficiently intact cell membrane, this can additionally allow an inference concerning the vitality of the target organisms to be labeled.

Quenching probes after annealing step: Falsely bound or insufficiently closed FISH probes ("molecular beacons") can be quenched once more or with better efficiency. To this end, the step to anneal the FISH probes is followed by introducing further oligos which are complementary to the FISH probes used. Said oligos (here: "quencher oligos") bear one or more quencher molecules at the ends thereof and bind to the FISH probes. The complementary sequence is longer than the hairpin-forming neck sequence of the FISH probes and therefore leads, after the annealing ("binding") thereof to the FISH probes, to a stable linearized (two-strand) structure. In said structure, the fluorophores of the FISH probes are present, then, in a quenched state owing to the quencher of the "quencher oligos" and generate only a low background fluorescence.

Immobilization of free FISH probes prior to measurement: Excess FISH probes can be removed from the sample mix. To this end, prior to measurement and after the step to anneal the FISH probes to the target molecules to be detected, the sample mixture is guided across a surface which binds the excess (non-target-sequence-bound FISH probes) and removes them from the mix prior to a measurement of the sample. Alternatively, bodies (such as, for example, "beads") to which the excess FISH probes bind can also be added to the sample. Thereafter, said bodies together with the excess FISH probes are separated from the reaction mix. In both cases, the surfaces or bodies are functionalized. Either they are coated/functionalized with oligos (e.g., DNA or RNA fragments) complementary to the FISH probes or they are coated/functionalized with other aids (e.g., antibodies directed against the fluorophores or quenchers of the FISH probes). What can be typically used for this purpose are biotinylated complementary oligos which are bound to a streptavidin-coated surface. It is likewise possible to couple the FISH probes used with possible binding aids (such as, for example, biotin or streptavidin) right from the start and to functionalize the surfaces/bodies used for immobilization with a complementary binding aid (e.g., FISH probes coupled with biotin and surfaces coated with streptavidin). The sample is flushed (multiple times) across such a functionalized surface/body and then removed. A large portion of the previously nonbound FISH probes is immobilized on said surface/body and therefore the background fluorescence which arises from the excess FISH probes is removed from the method.

Destruction of fluorescence of excess FISH probes prior to measurement: The fluorophores of the excess FISH probes (which are not bound to the target RNA/DNA) can be altered physically, chemically or biologically such that they exhibit no fluorescence relevant to measurement. This can, for example, be achieved by the addition of reagents (e.g., enzymes) (e.g., P450 monooxygenases) which, for example, modify (e.g., hydroxylate) aromatic structures of the fluorophores and therefore alter or prevent the relevant fluorescence properties. Such reagents are added only after the step to anneal the FISH probes. The method is chosen such that the fluorophores of the FISH probes bound within the target organisms are not affected, since they are, for example, protected by the cell membrane of the target organism and the fluorescence-inhibiting reagent therefore cannot get into the proximity thereof or cannot interact therewith.

Reduction of the fluorescent background by the use of "free" quencher molecules in concentrations greater than 1 mM. The high concentration of free quencher molecules brings about a preferential quenching or reduction of the fluorescence of free/excess oligo probes (e.g., linear, molecular beacon, scorpions, etc.) outside the labeled microorganisms. Quenching of the intracellularly bound fluorescence probes due to free quencher molecules is lessened due to the fact that diffusion of the free quencher molecules into the cell and distribution within the cell is hampered or prevented by the cellular constituents. The selection of the quencher molecules depends on the dye to be quenched. Suitable for the dyes FAM, Alexa488, Atto488 and the like are, for example, the isomers of methyl red (para-methyl red, meta-methyl red, o-methyl red; 4- or 3- or 2-{[4-(dimethylamino)phenyl]diazenyl}benzoic acid).

Immobilization of the target organisms: In a particularly advantageous configuration of the measurement system (e.g., a "lab-on-a-chip" system), the target organisms can be retained and/or concentrated on structures such as filters and especially track-etched membranes. It is therefore possible to separate the target organisms from the rest of the sample mix and to additionally clear excess FISH probes from the target organisms using flushing substances while labeled target organisms are retained. The FISH method described here can also be configured such that the described reaction steps, through the sequential addition of all the required reagents, are carried out directly on the filter structure (e.g., track-etched membrane). This can also reduce the reagents used in terms of the amount of substance thereof and therefore save production costs. To this end, it is necessary to flush the reagents individually onto the filter structure (e.g., by pneumatic and/or centrifugal transport). Particularly advantageous are configurations in which the target organisms can be first flushed onto a filter structure and then eluted (within the microfluidic system), for example by elution/flushing with a liquid against the direction of flushing/from the filter side facing away from the target organisms. In terms of their properties (such as autofluorescence), the filter structure should be designed such that direct reading of the measurement result on the filter structure can also be achieved.

Metering within the fluidic system: The FISH method described here makes it possible to counterbalance/buffer broad deviations of introduced samples volumes. To this end, it is necessary to add certain reagents and especially the FISH probes in great excess in order to have a sufficiently high concentration of FISH probes even at unexpectedly high sample volumes. However, a great excess of the FISH probes is also distinguished by a high background fluorescence. Therefore, the goal should be that of being able to work with the minimum and exactly harmonized concentration of FISH probes. To this end, what is carried out on a fluidic platform is first a metering step which standardizes ("meters") the starting sample volume in a loss-free manner and by, for example, centrifugal force. Owing to the now known starting volume, the FISH probes and the rest of the reagents can be set exactly in terms of their concentration and thus used within their performance optimum. To this end, the sample to be tested is first introduced, for example by centrifugal force, and then topped up with an excess of a buffer liquid up to an overflow channel. Unrequired buffer liquid is discharged via an overflow channel. The position of the overflow channel is chosen such that the liquid volume is known up to overflow of this "metering chamber". The design of the "metering chamber" ensures that no sample material is lost.

The FISH method described here makes it possible to state the vitality of tested organisms on the basis of the rRNA concentration thereof. The goal is to achieve rapid and highly specific differentiation between "living" and "dead" microorganisms. In general, the FISH method described here is based on the degradation of rRNA of dead microorganisms and synthesis of rRNA of living microorganisms for differentiation of the vitality of the microorganisms. However, the differing membrane permeability of living and dead organisms can likewise be utilized for differentiating living and dead organisms from one another relatively rapidly. The assumption here is that dead cells exhibit a distinctly increased permeability of the cell membrane. With the following options, it is possible to lower the detection threshold for "living" microorganisms, since dead microorganisms are no longer (sufficiently) labeled and living microorganisms (for their signal amplification or increasing of the difference between living and dead microorganisms) do not need to synthesize additional nucleic acids (e.g., rRNA) for living/dead differentiation. The method can therefore be significantly quickened:

Target depletion: The target nucleic acids (such as rRNA) can be degraded in dead microorganisms prior to the actual method. It is therefore possible to lower the detection threshold for "living" microorganisms and to wait for less rRNA synthesis (time) thereof, since dead microorganisms, owing to their missing target sequences, can no longer or hardly be labeled by the method. To this end, what can be added are either ribonucleases (such as ribonuclease A) alone or combinations of ribonucleases (e.g., ribonuclease HI) with nucleic acids (e.g.: DNA oligos). In the first case, ribonuclease A degrades the total RNA accessible thereto. In the second case, the introduced nucleic acids specifically bind to the nucleic acids to be degraded (e.g., rRNA) and the ribonuclease H recognizes the heteroduplex of introduced DNA and target rRNA.

Said heteroduplex is, then, specifically degraded by the ribonuclease H. In the case of the ribonucleases and nucleic acids, it is not possible to penetrate the membranes of living microorganisms-therefore, only nucleic acids of dead organisms having sufficiently permeable cell membranes are degraded. In addition, it is also possible to synthesize further structures ("anchor structures") onto, for example, the DNA oligos, which further hamper the penetration of intact cell membranes. In general, it should be ensured in this approach that, prior to addition of the FISH probes, the introduced ribonucleases are inactivated, inhibited or removed from the sample mix (e.g., by flushing steps on a filter/track-etched membrane). In addition, this method can also be combined with detection methods which, for example, are based on Forster resonance energy transfer or allow the reading of multiple labels in one microorganism. For example, proteins or DNA can be used as fluorescence donor (or fluorescence acceptor) or as second target structure for labels and be degraded in dead cells before the start of the actual method (e.g., by proteinases or deoxyribonuclease, which cannot penetrate intact membranes of living organisms). Therefore, only living microorganisms are captured by the method, since either dead cells have no fluorescence donor (or fluorescence acceptor) and thus no, for example, fluorescence in the relevant emission range, or they have only the fluorescence of the FISH probes, but not the fluorescence of the living/dead indicator (e.g., DNA or proteins which are no longer present), and are thus only mono-labeled.

Target blocking: The differing membrane permeability of living and dead microorganisms can be utilized for introducing nucleic acid (e.g., DNA oligos) into dead microorganisms and for occupying the test-relevant binding sites thereof (e.g., in the rRNA thereof) therewith. Thereafter, FISH probes, for example, can no longer bind to these positions, since the sites are already occupied. It should be ensured that the oligos introduced for occupying the relevant binding sites are removed from the sample mix before introduction of the FISH probes and before permeabilization of the living microorganisms. This can, for example, be achieved by flushing the sample mix through a filter (e.g., track-etched membrane).

Use of living/dead stains: It is possible for the FISH method used here to be carried out with additional living/dead differentiation of the relevant microorganisms. To this end, the target organisms can be fixed on a filter (such as a track-etched membrane) and treated with a living/dead dye (such as, for example, propidium iodide). The membrane is mapped by a sensor and the state "living" or "dead" is recorded for the respective microorganisms. Afterwards or at the same time, the FISH method is carried out and the microorganisms positively labeled by the FISH probes are additionally provided with the state "living" or "dead" in the data acquisition. Furthermore, the microorganisms can also be labeled using the FISH method described here and additionally provided with a living or dead dye (e.g., propidium iodide) if it has spectral properties different from the dyes of the FISH probes. Thereafter, multiple spectral properties (e.g., fluorescences in different wavelengths or spectra) are read per target organism and information about, for example, organism species and the vitality thereof is recorded at the same time.

In an advantageous embodiment according to the invention, the method is performed with a fluidic channel system. For example, a fluidic channel system can comprise a disk-shaped sample carrier. The advantage here is that specific detection of microorganisms can be made possible in different fields of application. For example, the method according to the invention can be used for microbiological food analysis, hygiene control, clinical and biotechnological applications and also environmental analysis.

A preferred application provides a fluidic channel system comprising means for carrying out the method, especially as described above and/or as per any of the claims directed to a method. For example, a detection zone and a preparation zone can be formed in the fluidic channel system for carrying out the method according to the invention. In particular, the cross-sections of the channels of the fluidic channel system can be matched to dimensions of the microorganisms.

The fluidic channel system can, for example, be designed as a sample carrier. The sample carrier can especially comprise at least one cavity containing at least one nucleic acid probe and at least one substance which promotes a differing alteration of the nucleic acid concentration, especially RNA concentration and/or DNA concentration, in dead cells and in living cells. As an alternative or in addition, the sample carrier can be provided with means for optical counting of labeled microorganisms.

The sample carrier can be designed as a disk-shaped sample carrier. For example, the sample carrier can be designed as a planar sample carrier. The advantage here is that the disk shape of the sample carrier can utilize centrifugal force for fluid conveyance. Fluid conveyance is also achievable by pressure or in another way. As an alternative, the sample carrier can have a three-dimensional extent, for example in the form of a cylinder or in the style of a cuvette.

For example, the disk-shaped nature can have rotational symmetry. This can be advantageous for centrifugation. It is also alternatively possible to form rectangular sample carriers, as in the case of a chip card, or segment-shaped sample carriers, as in the case of a pizza slice.

BRIEF DESCRIPTION OF THE DRAWINGS

The invention will now be described in more detail with reference to exemplary embodiments, without however being limited to said exemplary embodiments. Further exemplary embodiments arise from combination of the features of individual or multiple claims with one another and/or with individual or multiple features of the exemplary embodiments.

In the figures:

FIG. 1 shows a schematic depiction of a conventional, fluorescence in-situ hybridization (FISH)-based method, FIG. 2 shows a schematic depiction of a FISH method according to the invention.

DETAILED DESCRIPTION

Figure 3:
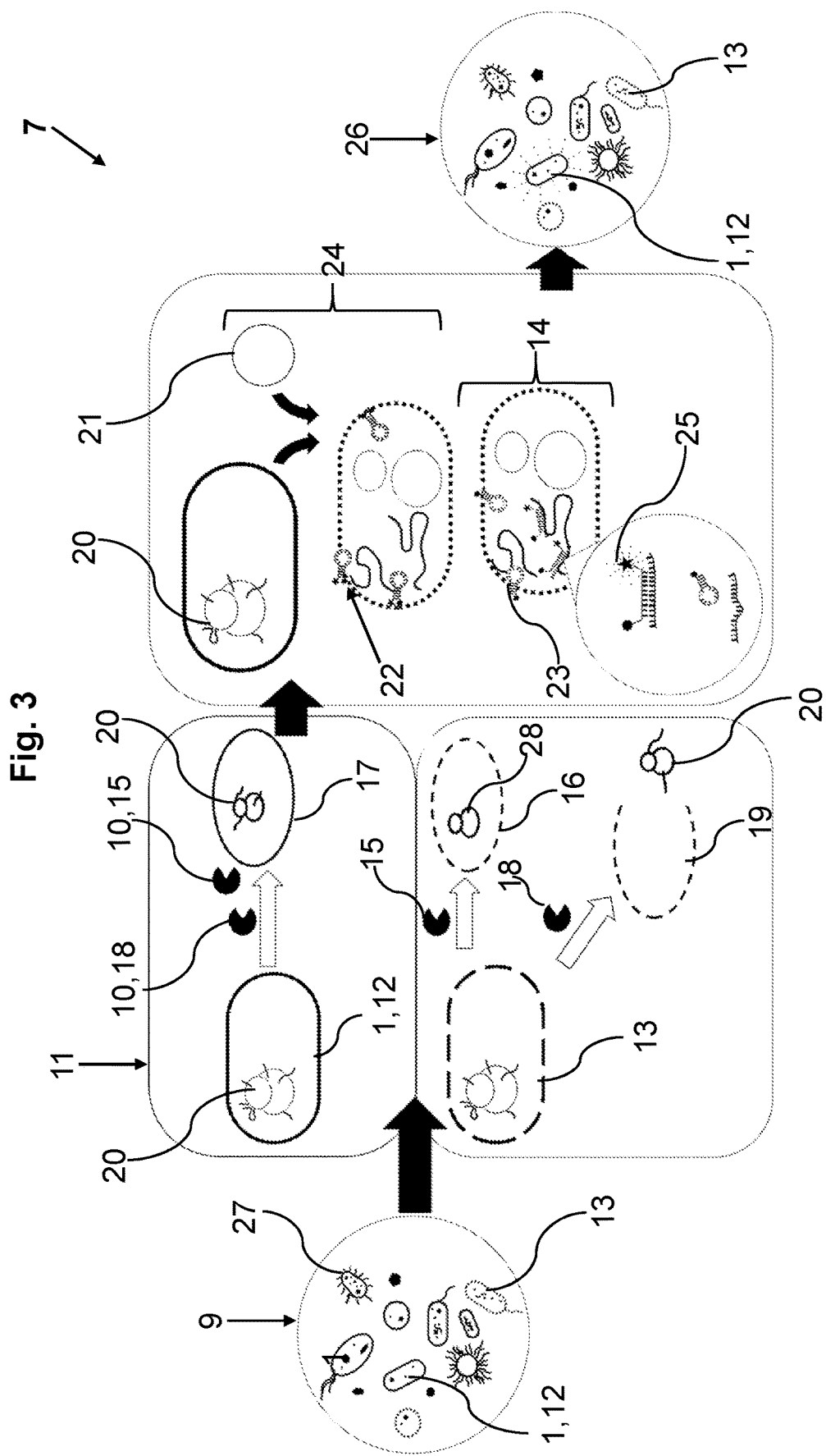
FIG. 3 shows a detailed depiction of the method according to FIG. 2.

FIGS. 1 to 3 show different embodiments of a method for detecting microorganisms.

FIG. 1 shows a conventional FISH method for specifically detecting nucleic acids in individual microorganisms 1, comprising the following steps: fixation and permeabilization 2 of the microorganisms 1 contained in a sample; washing 3 in order to remove the reagents used for permeabilization; incubation of the fixed and permeabilized microorganisms 1 with nucleic acid probes in order to bring about hybridization 4; removal or wash-away 5 of the nonhybridized nucleic acid probes; and subsequent analysis 6 of the microorganisms 1 hybridized to the nucleic acid probes.

FIG. 2 shows a method 7 according to the invention for specifically detecting microorganisms 1, combining the steps of permeabilization, fixation and hybridization into a single method step 8. Additional wash steps or buffer exchanges are not required. Before the hybridization, the microorganism-containing sample 9 is, for example, incubated 11 with enzymes 10.

FIG. 3 shows a method 7 according to the invention for detecting living microorganisms 1 and/or for differentiating between living 12 and dead 13 microorganisms in a sample 9 by in-situ hybridization 14, especially fluorescence in-situ hybridization, and optical analysis 26 of the microorganisms 1 to be detected, wherein at least one substance 15 is added to the sample 9 before the hybridization 14, which substance 15 promotes a differing alteration of the nucleic acid concentration, especially RNA concentration and/or DNA concentration, in dead cells 13 and in living cells 12.

The incubation 11 of the microorganisms 1 before the hybridization 14 with enzymes 10 which promote a differing alteration of the RNA concentration in dead cells and in living cells can greatly reduce dead particles. For example, the rRNA of the dead microorganism 13, which is much more permeable than a living microorganism, can be enzymatically degraded 16 by the action of RNAses 15, the same effect failing to appear 17 in the case of the living 12 microorganisms. The dead microorganism 13, in which the protection due to the outer membrane as diffusion barrier for large molecules, such as enzymes for example, is no longer present, can be completely dissolved 19 as particles as a result of the incubation 11 with lysozymes 18. Microorganisms with a highly pronounced outer envelope (*Listeria*, Staphylococci, etc.) additionally require further lysing enzymes such as mutanolysin, staphylolysin, etc. The ribosomes 20 consisting of RNAs and proteins can diffuse out of the completely or partially dissolved microorganism and can subsequently no longer be optically detected. Differentiation between living 12 and dead 13 microorganisms and the detection of exclusively living microorganisms can therefore be made possible.

In a preferred application, specific detection of living microorganisms was achieved by admixing a microorganism-containing sample with a hybridization buffer (e.g., composed of individual constituents or all constituents from the list: 900 mM NaCl, 20 mM Tris/HCl, 0.01% SDS, 5.3 M urea, 1 mM EDTA, 0.13 µM hybridization probe and pH 8.0) and incubating it at a temperature of 52° C. for a period of from 15 to 90 minutes. ListeriaFISH requires 1250 mM NaCl and no urea in the hybridization buffer. Microorganisms with a highly pronounced outer envelope (*Listeria*, Staphylococci, etc.) additionally require further lysing enzymes such as mutanolysin, staphylolysin, etc. Following the end of this incubation time, the samples in which hybridization is completed were analyzed by cytometry or fluorescence microscopy.

Before the hybridization, the sample is incubated with lysozyme and DNAse or RNAse and/or a protease in a concentration of below 5 mg/L in each case in a buffer combinable with microorganisms (e.g., PBS buffer, peptone water or Tris-HCl buffer) in order to improve living/dead differentiation.

According to the invention, what is therefore proposed is to provide a method 7 for detecting living microorganisms 1 and/or for differentiating between living 12 and dead 13 microorganisms in a sample 9 by in-situ hybridization 14, especially fluorescence in-situ hybridization, and optical analysis 26 of the microorganisms 1 to be detected, wherein at least one substance 10 is added to the sample 9 before the hybridization 14, which substance 10 promotes a differing alteration of the RNA concentration in dead cells and in living cells.

LIST OF REFERENCE SIGNS

1 Microorganisms to be detected
2 Fixation and permeabilization according to a conventional FISH method
3 Washing according to a conventional FISH method
4 Hybridization according to a conventional FISH method
5 Washing according to a conventional FISH method
6 Analysis
7 Method according to the invention
8 Permeabilization, fixation and hybridization, preferably comprised in one method step
9 Sample containing microorganisms
10 Enzymes
11 Incubation of the sample with enzymes
12 Living microorganisms
13 Dead microorganisms
14 Hybridization
15 RNAse
16 RNA degradation in dead microorganisms
17 No effect of RNAses in living microorganisms
18 Lysozyme
19 Dissolution of the dead microorganism as particle due to incubation with lysozymes
20 Ribosome consisting of RNAs and proteins
21 Detergent
22 Delivery of specific nucleic acid probes
23 Nucleic acid probe
24 Fixation of the microorganisms
25 Label
26 Optical analysis
27 Further microorganisms which are not to be detected
28 Ribosome with degraded RNAs

The invention claimed is:

1. A method for detecting living microorganisms or differentiating living microorganisms from dead microorganisms in a sample, comprising:
   adding at least one substance to the sample, wherein the sample contains both the living microorganisms and the dead microorganisms, wherein the living microorganisms and the dead microorganisms are the same microorganism species, wherein the at least one substance comprising an enzyme selected from the group consisting of DNase and RNase, wherein the cell membranes of the dead microorganisms are more permeable to the at least one substance than the cell membranes of the living microorganisms such that nucleic acids in the dead microorganisms are degraded after the adding step;
   removing, inactivating, or inhibiting the at least one substance from the sample;
   after removing, inactivating, or inhibiting step, producing permeabilized microorganisms by permeabilizing the living microorganisms in the sample;
   after the permeabilizing step, performing an in situ hybridization assay by adding a nucleic acid probe connected to a fluorescent label to both the permeabilized microorganisms and the dead microorganisms such that a hybridized nucleic acid probe connected to the fluorescent label and located on the permeabilized microorganisms is produced and/or a hybridized nucleic acid probe connected to the fluorescent label and located on the dead microorganisms is produced;

washing away the nucleic acid probe non-hybridized to its complementary nucleic acid from the sample;

detecting a fluorescent signal generated from the fluorescent label of the hybridized nucleic acid probe located on the permeabilized microorganisms and a fluorescent signal or a background fluorescent signal from the dead microorganisms using cytometry or fluorescence microscopy, wherein the florescent signal from the dead microorganisms is generated from the fluorescent label of the hybridized nucleic acid probe and is only present on the dead microorganisms if the hybridized nucleic acid probe is located on the dead microorganisms, and the background fluorescent signal from the dead microorganisms is present if the hybridized nucleic acid probe is absent on the dead microorganisms; and detecting the living microorganisms or differentiating the living microorganisms from the dead microorganisms in the sample by analysing the fluorescent signal from the permeabilized microorganisms and the fluorescent signal or the background fluorescent signal from the dead microorganisms.

2. The method as claimed in claim 1, wherein the at least one substance further comprises at least one of a chemical substance which promotes degradation of at least one of RNA and DNA, a chemical substance which increases membrane permeability in the dead microorganisms, a growth medium which promotes RNA synthesis in the living microorganisms, a polymerase, and a chaperone.

3. The method as claimed in claim 1, further comprising (1) incubating the sample after the adding step before the removing, inactivating, or inhibiting step or (2) incubating the sample after the adding step before the removing, inactivating, or inhibiting step and the time for incubating the sample is set such that cell division of the living microorganisms does not take place.

4. The method as claimed in claim 1, wherein the in situ hybridization assay includes at least one of a fixation step and a denaturation step.

5. The method as claimed in claim 1, further comprising (1) adding a detergent to the sample before the in situ hybridization assay is completed, (2) differentiating the living microorganisms from the dead microorganisms in the sample before the in situ hybridization assay, or (3) adding a detergent to the sample before the in situ hybridization assay is completed and differentiating the living microorganisms from the dead microorganisms in the sample before the in situ hybridization assay.

6. The method as claimed in claim 1, wherein the in situ hybridization assay comprises a denaturation step and the in situ hybridization assay is performed in a hybridization buffer containing at least one denaturant and an RNAse-inhibiting substance.

7. The method as claimed in claim 6, wherein the RNAse-inhibiting substance is selected from the group consisting of guanidinium chloride, guanidinium thiocyanate, formamide, dithiothreitol (DTT), diethyl pyrocarbonate (DEPC), oligovinylsulfonic acid, polyvinylsulfonic acid, heparin, and glutathione.

8. The method as claimed in claim 6, wherein the hybridization buffer contains at least one salt.

9. The method as claimed in claim 1, wherein the analysing step includes quantifying the fluorescent signal from the fluorescent label of the hybridized nucleic acid probe on the permeabilized microorganisms and the fluorescent signal or the background fluorescent signal from the dead microorganism.

10. The method as claimed in claim 1, wherein the nucleic acid probe is complementary to and hybridizes with an RNA from both the living microorganisms and the dead microorganisms in the sample if the dead microorganisms still contain the RNA.

11. The method as claimed in claim 1, wherein the nucleic acid probe is selected from the group consisting of linear oligonucleotide probes, mono-labeled nucleic acid probes, dual-labeled nucleic acid probes, tetra-labeled nucleic acid probes, multi-labeled nucleic acid probes, nucleic acid probes having a secondary structure, molecular beacons and Scorpions probes.

12. The method as claimed in claim 1, wherein the method is performed in a fluidic channel system.

13. The method as claimed in claim 1, wherein the nucleic acid probe is a fluorescence in situ hybridization (FISH) probe and the hybridizing step comprises a step for reducing a background fluorescent signal comprising:

adding a quenching oligonucleotide probe comprising a quenching molecule of the fluorescent label, wherein the quenching oligonucleotide probe is complementary to the nucleic acid probe and hybridizes with the nucleic acid probes non-hybridized to its complementary nucleic acid in the sample such that the quencher molecule quenches the fluorescent signal of the fluorescent label of the nucleic acid probe non-hybridized to its complementary nucleic acid in the sample.

14. The method as claimed in claim 1, further comprising a step for improving differentiating the living microorganisms from the dead microorganisms which includes at least one selected from the group consisting of initially degrading the target nucleic acids in the dead microorganisms, introducing nucleic acids into the dead microorganisms and occupying the hybridization sites of the nucleic acid probe located on its complementary nucleic acid of the dead microorganisms, and staining the living microorganisms and the dead microorganisms with stains that are used for determining whether a microorganism is living or dead.

15. The method of claim 1, wherein the nucleic acids in the dead microorganisms that are degraded after the adding step are least one of RNA and DNA.

16. The method of claim 2, wherein:

the chemical substance which increases membrane permeability in the dead microorganisms includes at least one enzyme selected from the group consisting of murein hydrolase, lysozyme, mutanolysin, glucosaminidase, peptidase, and amidase; and the growth medium which promotes RNA synthesis in the living microorganisms includes at least one of a peptone water, CASO broth, DEV lactose broth, MRS medium, thioglycolate broth, brain heart infusion broth, casein-peptone soymeal-peptone broth, Hajna's Gram-negative (GN) enrichment broth and/or LB medium.

17. The method of claim 4, wherein the in situ hybridization assay includes the denaturation step and the hybridization buffer of the in situ hybridization assay contains a nontoxic substance selected from the group consisting of guanidinium chloride, urea, guanidinium thiocyanate, and formamide, and the nontoxic substance is a denaturation substance.

* * * * *